J. W. T. CADETT.
Camera.
No. 208,956.  Patented Oct. 15, 1878.
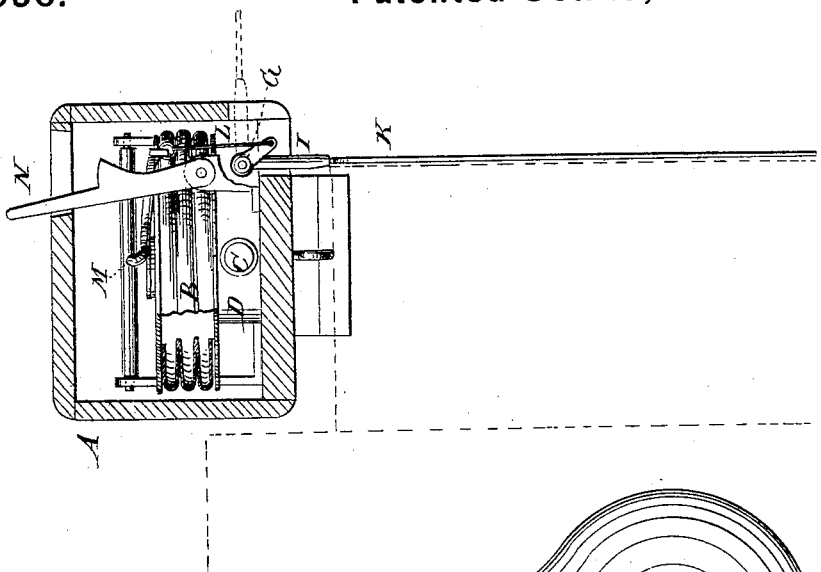
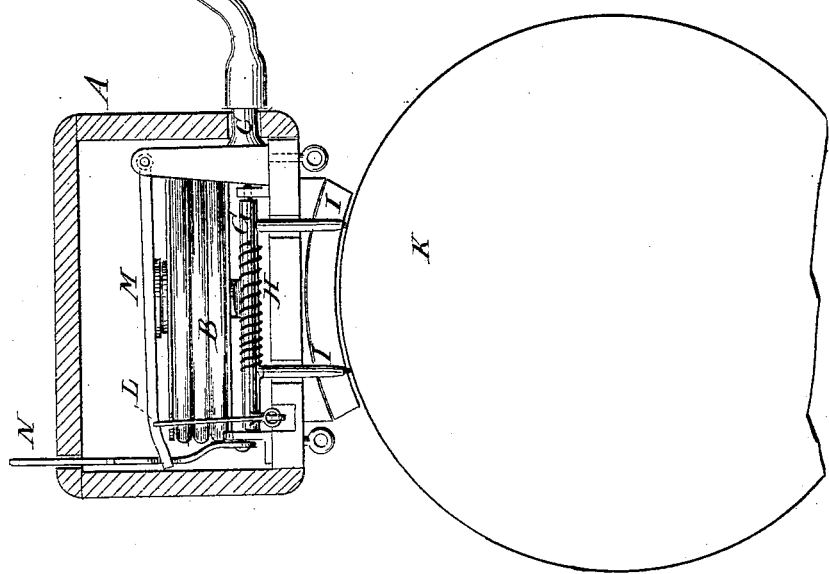
WITNESSES:
Chas. Nida
C. Sedgwick
INVENTOR:
J. W. T. Cadett
BY Munn & Co
ATTORNEYS.

UNITED STATES PATENT OFFICE.

JAMES W. T. CADETT, OF 68 CAMBERWELL GROVE, SURREY COUNTY, ENGLAND.

IMPROVEMENT IN CAMERAS.

Specification forming part of Letters Patent No. 208,956, dated October 15, 1878; application filed July 6, 1878; patented in England, March 19, 1878.

*To all whom it may concern:*

Be it known that I, JAMES WILLIAM THOMAS CADETT, of 68 Camberwell Grove, in the county of Surrey, England, have invented new or improved pneumatic arrangements for facilitating the uncapping or exposing and capping or shutting the lenses used in apparatus for depicting persons or objects by photographic means, of which the following is a specification:

In carrying out my invention I adopt, mainly, the following arrangements: To a portion of the apparatus holding the lens, or to the camera, I fit or secure a case or box, which contains a bellows or case, acted on by spring or otherwise, said bellows being in communication with a pipe or opening into the pneumatic tubing. On a spindle acting on or by the said bellows is fitted or secured a shutter, which projects beyond the said case or box.

The action is as follows: By pressing an air or gas chamber in communication with the tubing, the bellows or case fitted or secured to the apparatus is actuated, and the shutter or cap is moved, so as to uncap or expose the lens, as required.

The bellows, disk, or chamber can be fitted to the photographic apparatus without a case, and springs applied thereto may, as is evident, be sometimes dispensed with, though springs are preferred to be used. A locking arrangement is generally used, which holds the shutter or cap so as to get the proper focus.

Figure 1, front view of my improved pneumatic arrangements for photographic purposes, (with case in section;) Fig. 2, side view.

A is the case or box, fitted or secured to the portion of apparatus holding the lens; B, bellows or case; C, pipe secured to portion D, said pipe being in communication with the bellows or case; E, length of tubing, fitted onto said pipe C, terminating in the air or gas chamber F; G, spindle, fitted in bearings, as shown, said spindle being provided with a spring, H; I, arms secured to spindle G, said arms being fitted with the cap or shutter K; L, connection formed between the arm M, fitted to spindle G, and the portion pressing on the bellows or case B, whereby the shutter or cap, when the bellows is inflated, turns the spindle G, and with it the shutter or cap K, to the position shown by dotted lines in Fig. 2. By releasing the pressure on the air or gas chamber F, the bellows, chamber, or disk assumes its normal condition, as shown in the drawings.

N is the locking arrangement for holding the shutter or cap.

What I claim is—

In a device for operating the shutter or cap for the lens of a photographic camera, the combination of the elastic bulb F, bellows B, and shield K.

The above specification signed by me this 30th day of April, 1878.

J. W. T. CADETT. [L. S.]

Witnesses:
   THOMAS CADETT,
     68 *Camberwell Grove, London.*
   THOMAS MORGAN,
     21 *Cockspur Street, London, S. W.*